United States Patent [19]
Stapleton

[11] Patent Number: 5,758,810
[45] Date of Patent: Jun. 2, 1998

[54] VEHICLE LUGGAGE CARRIER HAVING ADJUSTABLE CROSSBAR

[75] Inventor: Craig Stapleton, Clarkston, Mich.

[73] Assignee: Advanced Accessory Systems LLC. Sterling Heights, Mich.

[21] Appl. No.: 688,863

[22] Filed: Jul. 31, 1996

[51] Int. Cl.$^6$ ........................ B60R 9/04
[52] U.S. Cl. ........................ 224/321
[58] Field of Search ............ 224/321, 330, 224/331, 315, 323

[56] References Cited

U.S. PATENT DOCUMENTS

| | | | |
|---|---|---|---|
| 2,788,929 | 4/1957 | Gallagher | 224/323 |
| 4,101,061 | 7/1978 | Sage et al. | 224/322 |
| 4,162,755 | 7/1979 | Bott . | |
| 4,487,348 | 12/1984 | Mareydt . | |
| 5,226,570 | 7/1993 | Pedrini . | |
| 5,275,320 | 1/1994 | Duemmler . | |
| 5,397,042 | 3/1995 | Pedrini | 224/315 X |

FOREIGN PATENT DOCUMENTS

| | | | |
|---|---|---|---|
| 94021490 | 9/1994 | WIPO | 224/330 |

Primary Examiner—Renee S. Luebke
Attorney, Agent, or Firm—Rader, Fishman & Grauer PLLC

[57] ABSTRACT

A cross bar used in roof luggage carriers for vehicles including a shaft having first and second threaded segments which are threaded in opposite directions relative to one another. A first pair of gripping jaws includes first gripping jaws which are threadedly engaged to the shaft. The first gripping jaw is threadedly engaged to the first threaded portion of the shaft and the second gripping jaw is threadedly engaged to the second threaded portion of the shaft. When the shaft is rotated, the first and second jaws move relative to one another thereby gripping or releasing a side rail placed there between. The gripping jaws are adapted to slide on the shaft thereby allowing them to float independent of a second pair of gripping jaws located along the same shaft. Thus, the cross bar of the present invention can be used to accommodate vehicles having non-parallel side rails. Also, the cross bar is adjusted from one side of the vehicle thereby avoiding the inconvenience of having the user access both sides of the vehicles to adjust the cross rail.

26 Claims, 3 Drawing Sheets

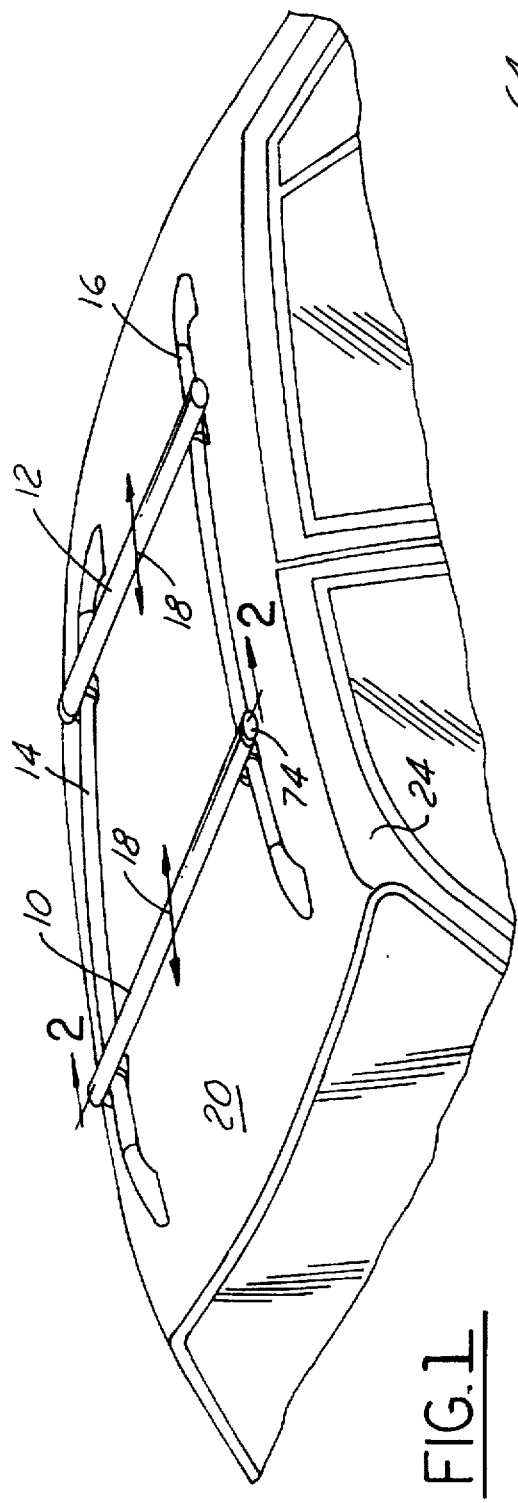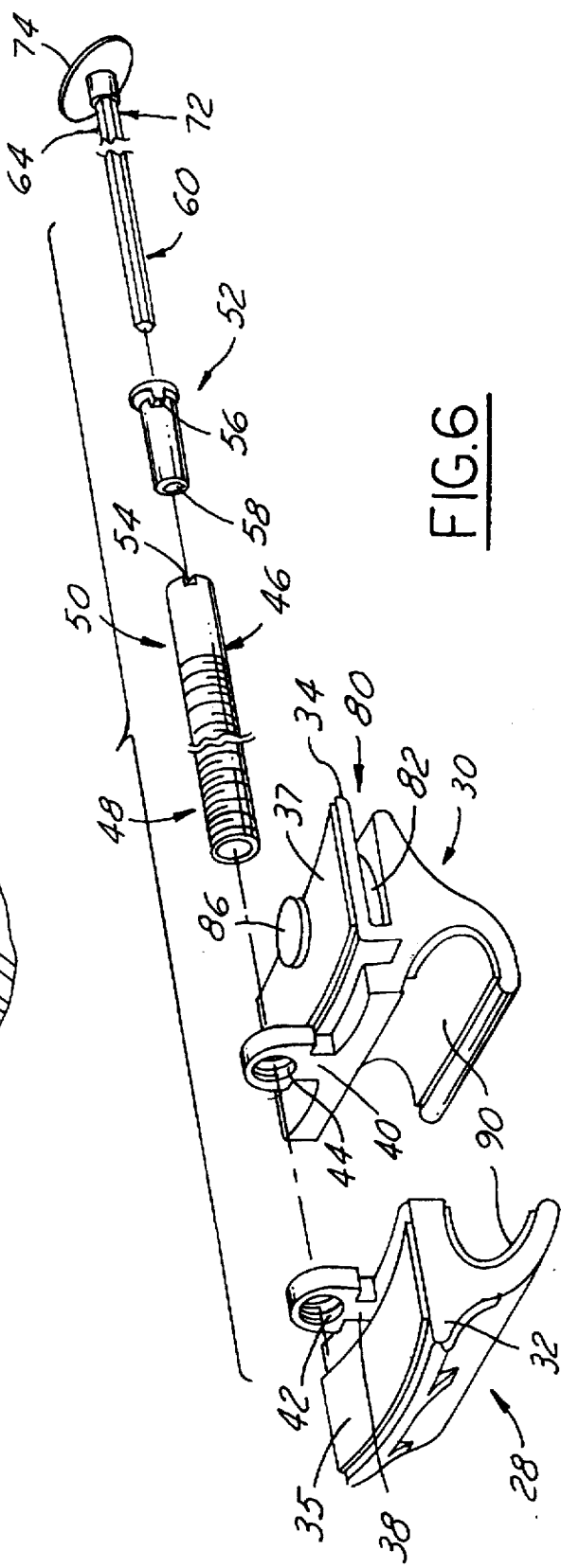

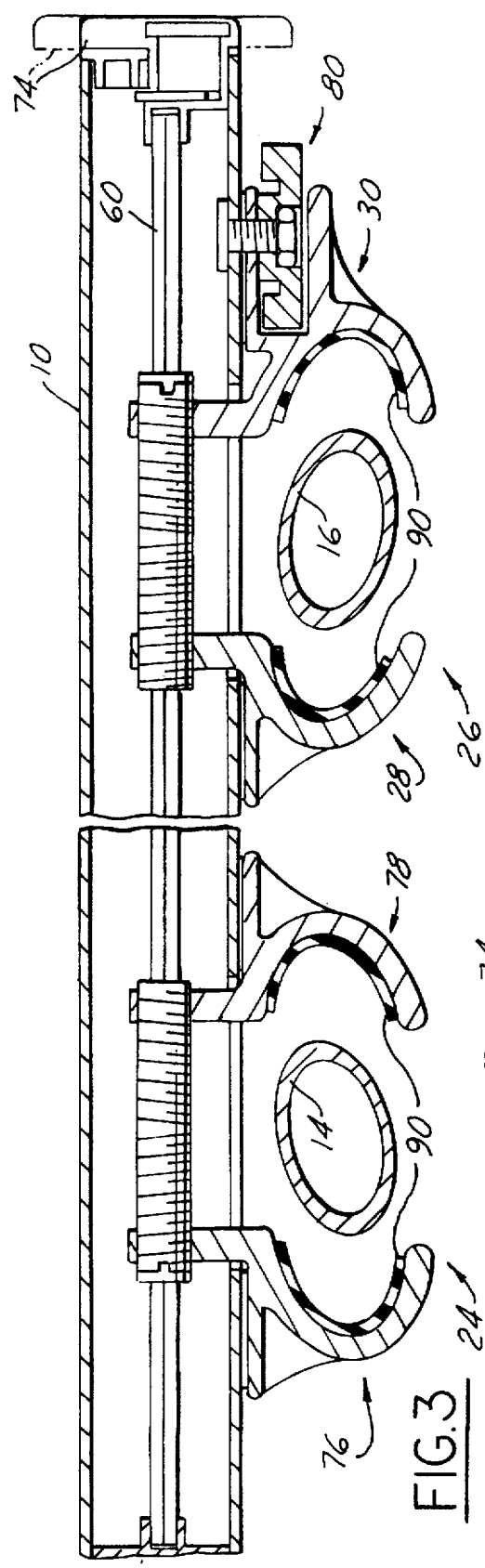

VEHICLE LUGGAGE CARRIER HAVING ADJUSTABLE CROSSBAR

TECHNICAL FIELD

This invention generally relates to luggage carriers and more particularly relates to accessory roof rack systems for motor vehicles having adjustable cross rails.

BACKGROUND OF THE INVENTION

Roof rack systems for motor vehicles generally consist of two side rails and two cross rails. The side rails typically extend longitudinally on either side of the vehicle roof and are fixed to the roof at the time of manufacture of the vehicle. The side rails serve as a support structure for the detachable cross-rails which serve as the transverse girders of the roof luggage carrier system. The cross-rails extend between the side rails and are attached thereto by means of clamping devices.

A number of clamping and retaining devices are generally known. For example, U.S. Pat. No. 5,275,320 sets forth a removable clamping assembly for a roof luggage carrier. The clamping assembly includes supporting jaws that can be inserted in a lower longitudinal slot on the transverse girder. The clamping assembly also includes clamping jaws. The clamping assembly is actuated by means of a clamping screw bolt which extends inside the transverse girder in its longitudinal direction.

Another known clamping and retaining device is set forth in U.S. Pat. No. 5,226,570. This patent sets forth a self-centering roof rack system for transporting bicycles and other sporting goods on the roof of a motor vehicle. The rack includes a transverse bar mounted on the roof and supported by upright members at each end. The upright members are simultaneously movable by rotation of a knob at one end of the rack by means of rotation of a threaded shaft. The upright members are provided with either a pivoting or sliding mechanism that causes a floating hook adapted to grip a motor vehicle roof edge to move upwardly and outwardly to firmly engage the roof as the uprights are moved towards each other.

Although the above referenced inventions may be effective for their stated purposes, they are not without their drawbacks. For example, the device of U.S. Pat. No. 5,226,570 is somewhat cumbersome and necessitates many mechanical parts. Also, it is not directly mountable to vehicles which are fitted with accessory side rails from the factory. Also, the invention of U.S. Pat. No. 5,275,320 is deficient because the cross rails cannot be loosened from one side of the vehicle but rather a user must loosen screw bolt 8 on the passenger side of the vehicle and then walk around to the driver side of the vehicle to loosen the remaining side.

In view of these shortcomings of the state of the art roof rack systems, it is an object of this invention to provide a roof rack system which is simple in design and allows for adjusting its cross rails by a user from one, and only one, side of the vehicle.

It is a further object of the invention to provide a cross bar for use on a roof rack systems which accommodates side rails which are nonparallel.

SUMMARY OF THE INVENTION

In one aspect, the present invention includes a cross bar having a shaft which includes first and second threaded segments. A first pair of gripping jaws are threadedly engaged to the first threaded segment of the shaft and a second pair of gripping jaws are threadedly engaged to the second threaded segment of the shaft. The first pair of gripping jaws includes means for translating rotation of the shaft into relative movement between the first pair of gripping jaws and the second pair of gripping jaws includes means for translating the rotation of the threaded shaft into relative movement between the second pair of gripping jaws. The relative movement of the first pair of gripping jaws is effective for gripping the first side rail and the relative movement of the second pair of gripping jaws is effective for gripping the second side rail.

In the second aspect, the present invention provides a cross bar used in roof luggage carriers for vehicles, wherein the cross bar is supported by first and second side rails. The cross bar includes a shaft having a longitudinal axis and a sleeve surrounding the shaft. The sleeve includes an internal passage which is keyed to the outside periphery of the shaft such that said sleeve freely slides over said shaft along said longitudinal axis of said shaft, but rotates with said shaft when said shaft is rotated about the longitudinal axis of the shaft. A pair of gripping jaws is threadedly engaged to the sleeve wherein the rotation of the shaft about its longitudinal axis causes the gripping jaws to move relative to each other wherein the jaws a effective for gripping at least one of the first and second side rails.

Preferably, the sleeve includes a first threaded portion threaded in a right hand thread which is threadedly engaged to one of the gripping jaws in the pair of gripping jaws and wherein the sleeve includes a second threaded portion threaded in a left hand thread which is threadedly engaged to the remaining gripping jaw in the pair of gripping jaws.

The cross bar preferably includes means attached to the gripping jaws for locking the gripping jaws and thereby preventing any movement of said gripping jaws relative to at least one of the first and second side rails.

The shaft preferably includes a handle for turning the shaft and preferably the shaft has a cross sectional area which is generally hexagonal.

BRIEF DESCRIPTION OF THE DRAWINGS

FIG. 1 is a perspective view of the roof rack system of the present invention shown installed on the roof of a vehicle.

FIG. 3 shows the cross rail of FIG. 2 with the gripping jaws in the relaxed position.

FIG. 4 is an end view taken substantially along lines 4—4 of FIG. 2.

FIG. 5 is a partial cross sectional view taken substantially along lines 5—5 of FIG. 2.

FIG. 6 is an exploded view of one-half of the gripping jaw assembly of FIG. 3.

DETAILED DESCRIPTION OF THE PREFERRED EMBODIMENTS

Figure 2:
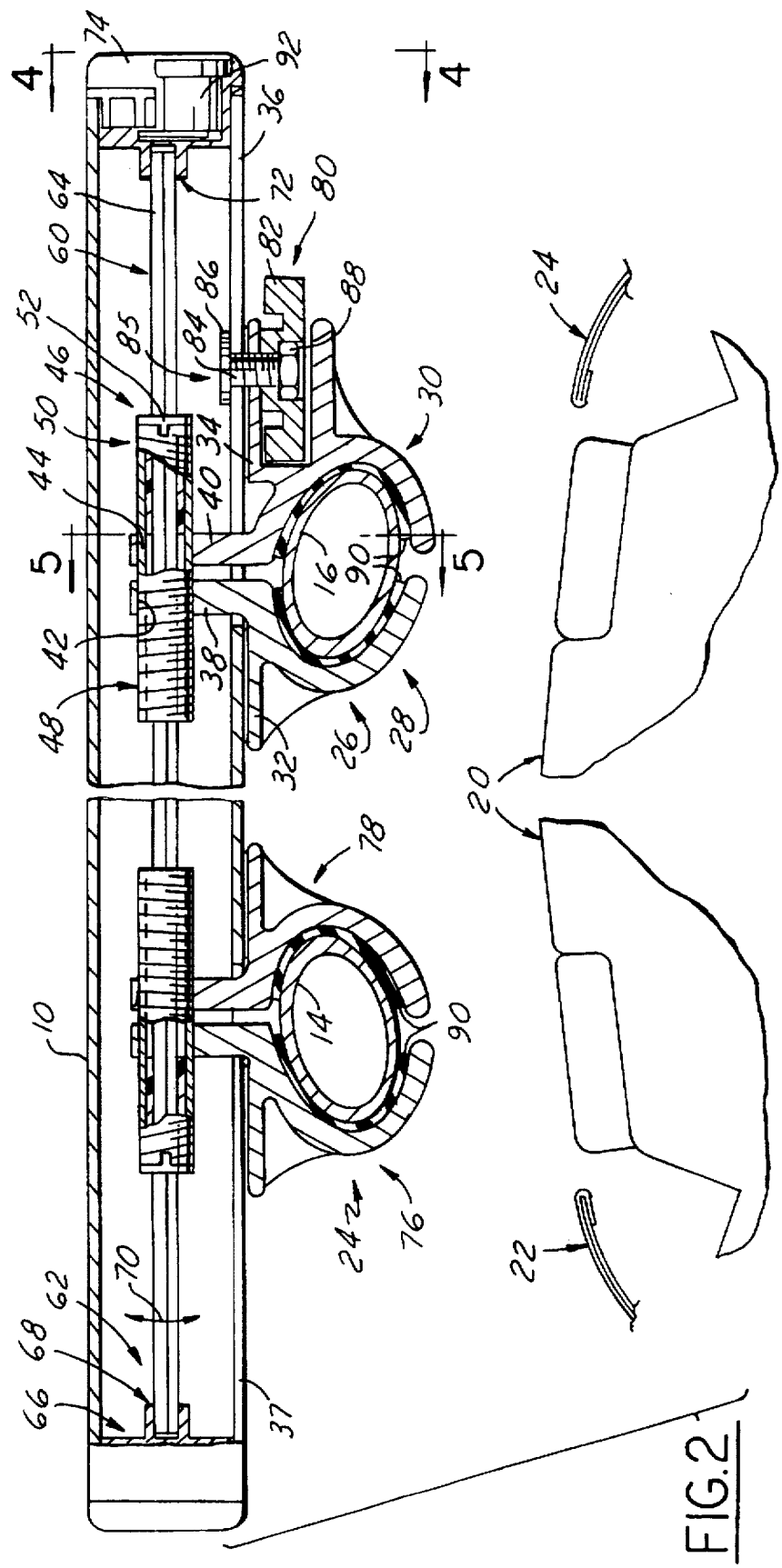
FIG. 2 is a partial cross sectional view taken substantially through lines 2—2 of FIG. 1.

Now referring to FIG. 1, the accessory roof rack system of the present invention includes cross rails 10 and 12 which are supported by side rails 14 and 16. Side rails 14 and 16 are typically provided by the automobile manufacturer and are present on the vehicle at the time of sale. Of course, this does not have to be the case and such side rails 14, 16 can be added as an after market item. Also, it is important to note that side rails 14, 16 do not have to be parallel in order for the accessory roof rack system of the present invention to operate properly. Cross rails 10, 12 can be adjusted along length 18 of side rails 14, 16, even in applications where side rails 14, 16 are not parallel. Also, as will be further explained, cross rails 10, 12 can be adjusted along longitudinal direction 18 from one side of the vehicle.

Now referring to FIGS. 1 and 2, vehicle roof 20 is shown flanked by passenger side front door and driver side front door 24. Side rails 14, 16 are supported by, and attached to, vehicle roof 20. In the application as shown, side rails 14, 16 are spaced from roof 20; however, in some automotive designs, side rails 14, 16 are formed as rails in continuous contact along the top of roof 20. The roof rack system of the present invention is equally applicable to either side rail design.

Cross rail 10 is attached to side rails 14, 16 by way of gripping jaw assemblies 24, 26. The identical type of assembly is used to attach cross rail 12 to side rails 14, 16. Gripping jaw assembly 26, which is substantially identical to assembly 24, includes left jaw 28 and right jaw 30. Each jaw 28, 30 includes a respectively associated base plate portion 32, 34 which supports cross rail 10 by way of respectively associated nylon pads 35,37. Cross rail 10 is preferably tubular and includes a bottom portion having opening 36 wherein arms 38, 40 of respectively associated left jaw 28 and right jaw 38 extend there through. Arms 38, 40 include respectively associated threaded openings 42, 44. Threaded opening 42 is threaded in an opposite direction to that of threaded opening 44. For example, if opening 42 is threaded according to a left handed convention then opening 44 would be threaded according to a right hand convention.

Now referring to FIGS. 2 and 6, sleeve 46 includes a first threaded portion 48 and a second threaded portion 50. First and second threaded portions 48, 50 are threaded onto the respectively associated arm portions 38, 40 of gripping jaw assembly 26. Sleeve 46 includes insert 52 which is keyed to sleeve 46 by way of matingly engaging surfaces 54, 56. Matingly engaging surfaces 54, 56 prevent any rotational movement between sleeve 46 and insert 52. Insert 52 has an opening 58 there through which has a cross section which is adapted to matingly engage the cross section of shaft 60. In its preferred embodiment, opening 58 and shaft 60 have a hexagonal cross sectional geometry. Opening 58 and shaft 60 are sized relative to one another such that insert 52 freely slides along shaft 60. Shaft 60 includes a first end 62 which terminates into guide collar 66. Guide collar 66 includes opening 68 which receives end 62 and allows end 62 to freely rotate 70 therein. Second end 64 of shaft 60 is received into opening 72 of handle 74 and is positively constrained therein for rotation therewith.

OPERATION OF THE PRESENT INVENTION

Now referring to FIGS. 1–6, when it is desired to reposition cross rail 10 along longitudinal direction 18 of side rails 14, 16, the operator rotates handle 74 counterclockwise. This rotation causes shaft 60 to rotate which, in turn, rotates insert 52. Because insert 52 is keyed to sleeve 46, sleeve 46 also rotates counterclockwise. Sleeve 46 has first and second threaded portions 48, 50, and its counterclockwise rotation causes arms 38, 40 to move away from one another thereby releasing the grip of jaws 28, 30 on side rail 16 (released grip shown in FIG. 3). The exact same result is simultaneously achieved with respect to passenger side gripping jaws 76, 78 wherein they relax their grip on side rail 14. Cross rail 10 can now be repositioned generally longitudinally along side rails 14, 16. Once cross rail 10 is properly positioned it is fixed in place by rotating handle 74 clockwise. This causes jaws 28, 30 to move toward each other thereby clamping side rail 16. Likewise jaws 76, 78 are effective for clamping side rail 14 (clamped grip shown in FIG. 2). Cross rail 12 may be fitted with the same mechanism as that described with respect to cross rail 10. In view of the above description, it is easily understood how the roof rack system of the present invention is effective for adjusting 18 the position of a cross rail from one side of the vehicle.

It is also important to note that in applications where side rails 14, 16 are nonparallel (i.e. splayed side rails), the jaw assemblies 24, 26 permit cross rails 10, 12 to be positioned 18 anywhere along side rails 14, 16. This feature can be easily understood, in view of FIG. 2, inasmuch as insert 52 is free to slide (longitudinally) along shaft 60 leaving the positioning of jaws 28, 30 within slot 36 determined solely by the location of side rail 16. Likewise, the position of jaws 76, 78 within slot 37 are determined solely by the location of side rail 14. Thus, as long as side rails 14, 16 do not extend beyond the range of adjustability offered by the span covered by slots 36 and 37, cross rail 10 can be positioned anywhere along the length of side rails 14, 16.

In a preferred embodiment, at least one of the jaws (see jaw 30 in FIGS. 2–4 and 6) is fitted with an anti-slide lock assembly 80. This anti-slide assembly includes thumb wheel 82 which is threadedly joined to shaft 84 of fastener 85. Fastener 85 includes head portion 86 which prevents fastener 85 from pulling through slot 36 of cross rail 10. Nut 88 is fixedly received within thumb wheel 82 such that when thumb wheel 82 is rotated, nut 88 rotates therewith. When thumb wheel 80 is tightened, base plate 34 is squeezed against cross rail 10 preventing any relative movement between jaws 28, 30 and cross rail 10. Although it is also possible to fit jaw 76 with the same type of anti-slide lock assembly as shown for jaw 30, it is not believed a second assembly 80 is necessary in order to prevent the shifting of cross rail 10 even under conditions where cross rail 10 is heavily loaded. Preferably, one of the jaw assemblies on cross rail 12 would also be fashioned with anti-lock assembly 80.

The gripping effectiveness between jaws 28, 30, 76, 78 and their respectively associated side rails 14, 16 can be improved by disposing anti-slip material 90 between jaws 28, 30, 76, 78 and their respectively associated side rails 14, 16. Also, handle 74 can be fashioned with a key lock or combination lock anti-theft mechanism which allows the vehicle user to secure cross rails 10, 12 to side rails 14, 16 to prevent theft of the cross rails (for clarity sake, lock 92 is not shown in FIGS. 4 or 6).

It is recognized that those skilled in the art may make various modifications or additions to the preferred embodiments chosen here to illustrate the present invention, without departing from the spirit of the present invention. Accordingly, it is to be understood that the protection sought to be afforded hereby should be deemed to extend to the subject matter claimed and in all equivalents thereof fairly within the scope of this invention.

I claim:

1. A cross bar used in roof luggage carriers for vehicles, said cross bar supported by first and second side rails, comprising:

a shaft having a longitudinal axis, a sleeve surrounding said shaft, wherein said sleeve includes an internal passage which is keyed to the outside periphery of the shaft such that said sleeve freely slides over said shaft along said longitudinal axis of said shaft, and rotates with said shaft when said shaft is rotated about said longitudinal axis, a pair of gripping jaws threadedly engaged to said sleeve, wherein said rotation of said shaft about said longitudinal axis causes said pair of gripping jaws to move relative to each other, wherein said jaws are effective for gripping at least one of said first and second side rails.

2. The cross bar of claim 1, wherein said sleeve includes a first threaded portion threaded in a right hand thread which is threadedly engaged to one of said gripping jaws in said pair of gripping jaws, and wherein said sleeve includes a second threaded portion threaded in a left hand thread which is threadedly engaged to the remaining gripping jaw in said pair of gripping jaws.

3. The cross bar of claim 1 further including means attached to said pair of gripping jaws for locking said gripping jaws and thereby preventing any movement of said gripping jaws relative to at least one of said first and second side rails.

4. The cross bar of claim 1, further including a handle attached to said shaft.

5. The cross bar of claim 1, wherein said shaft has a cross sectional area which is generally hexagonal.

6. The cross bar of claim 1, wherein said internal passage of said sleeve is generally hexagonal.

7. The cross bar of claim 1, further including an insert disposed between said internal passageway of said sleeve and said shaft.

8. The cross bar of claim 1, further including anti-slip material fastened to an exterior surface of said pair of gripping jaws.

9. A cross bar used in roof luggage carriers for vehicles, said cross bar supported by first and second side rails, comprising:

a shaft having a longitudinal axis, first and second sleeves surrounding said shaft, wherein each said sleeve includes an internal passage which is keyed to the outside periphery of the shaft such that said sleeves freely slide over said shaft along said longitudinal axis of said shaft, and said sleeves rotate with said shaft when said shaft is rotated about said longitudinal axis, a first pair of jaws threadedly engaged to said first sleeve, wherein said rotation of said shaft about said longitudinal axis causes said first pair of jaws to move relative to each other, a second pair of jaws threadedly engaged to said second sleeve, wherein said rotation of said shaft about said longitudinal axis causes said second pair of jaws to move relative to each other, wherein said first pair of jaws are effective for gripping said first side rail and wherein said second pair of jaws are effective for gripping said second side rail.

10. The cross bar of claim 9, wherein said first and second sleeves each include a first threaded portion threaded in a right hand thread and a second threaded portion threaded in a left hand thread.

11. The cross bar of claim 9 further including means attached to at least one of said jaws in said first and second pairs of jaws for locking said jaws and thereby preventing any movement of said jaws relative to at least one of said first and second side rails.

12. The cross bar of claim 9, further including a handle attached to said shaft.

13. The cross bar of claim 12, wherein said handle includes a locking mechanism for selectively preventing movement of the handle.

14. The cross bar of claim 9, wherein said shaft has a cross sectional area which is generally hexagonal.

15. The cross bar of claim 9, wherein said internal passages of said first and second sleeves are generally hexagonal.

16. The cross bar of claim 9, further including an insert disposed between said internal passageway of said sleeve and said shaft.

17. The cross bar of claim 9, further including anti-slip material fastened to an exterior surface of at least one of said first pair and said second pair of jaws.

18. A roof luggage carrier for vehicles, comprising:

first and second side rails adapted to be fastened to the vehicle, a cross bar including a shaft having a longitudinal axis, first and second sleeves surrounding said shaft, wherein each said sleeve includes an internal passage which is keyed to the outside periphery of the shaft such that said sleeves freely slide over said shaft along said longitudinal axis of said shaft, and said sleeves rotate with said shaft when said shaft is rotated about said longitudinal axis, a first pair of jaws threadedly engaged to said first sleeve, wherein said rotation of said shaft about said longitudinal axis causes said first pair of jaws to move relative to each other, a second pair of jaws threadedly engaged to said second sleeve, wherein said rotation of said shaft about said longitudinal axis causes said second pair of jaws to move relative to each other, wherein said first pair of jaws are effective for gripping said first side rail and wherein said second pair of jaws are effective for gripping said second side rail.

19. The cross bar of claim 18, wherein said first and second sleeves each include a first threaded portion threaded in a right hand thread and a second threaded portion threaded in a left hand thread.

20. The cross bar of claim 18 further including means attached to at least one of said jaws in said first and second pairs of jaws for locking said jaws and thereby preventing any movement of said jaws relative to at least one of said first and second side rails.

21. The cross bar of claim 18, further including a handle attached to said shaft.

22. The cross bar of claim 21, wherein said handle includes a locking mechanism for selectively preventing movement of the handle.

23. The cross bar of claim 18, wherein said shaft has a cross sectional area which is generally hexagonal.

24. The cross bar of claim 18, wherein said internal passages of said first and second sleeves are generally hexagonal.

25. The cross bar of claim 18, further including an insert disposed between said internal passageway of said sleeve and said shaft.

26. The cross bar of claim 18, further including anti-slip material fastened to an exterior surface of at least one of said first pair and said second pair of jaws.

* * * * *